(12) United States Patent
Bauer et al.

(10) Patent No.: US 8,810,357 B2
(45) Date of Patent: Aug. 19, 2014

(54) TRANSMITTING INSTRUCTIONS IN A MEDICAL SUPPLY UNIT

(75) Inventors: Georg Bauer, Schwabhausen (DE); Mathias Frenzel, Germering (DE); Rudolf Marka, Ismaning (DE); Rouven Rosenheimer, Munich (DE)

(73) Assignee: Trumpf Medizin Systeme GmbH + Co. KG, Saalfeld (DE)

( * ) Notice: Subject to any disclaimer, the term of this patent is extended or adjusted under 35 U.S.C. 154(b) by 380 days.

(21) Appl. No.: 12/947,499

(22) Filed: Nov. 16, 2010

(65) Prior Publication Data

US 2011/0118879 A1    May 19, 2011

(30) Foreign Application Priority Data

Nov. 16, 2009 (EP) .................................... 09176116

(51) Int. Cl.
*G08C 19/12* (2006.01)

(52) U.S. Cl.
USPC ...................... 340/3.5; 340/13.24; 340/13.32

(58) Field of Classification Search
USPC ................. 340/3.5; 361/600, 679.01–679.61, 361/724–727
See application file for complete search history.

(56) References Cited

U.S. PATENT DOCUMENTS

| | | | | |
|---|---|---|---|---|
| 5,455,008 A | * | 10/1995 | Earley et al. ................... | 422/511 |
| 6,028,984 A | * | 2/2000 | Kimball ......................... | 709/249 |
| 2005/0102167 A1 | * | 5/2005 | Kapoor ............................. | 705/3 |
| 2005/0251228 A1 | * | 11/2005 | Hamel ........................... | 607/60 |
| 2006/0031619 A1 | * | 2/2006 | Nguyen et al. ................. | 710/305 |
| 2007/0138992 A1 | * | 6/2007 | Prisco et al. ............. | 318/568.21 |
| 2009/0201632 A1 | | 8/2009 | Bauer et al. | |
| 2009/0216100 A1 | * | 8/2009 | Ebner et al. ................... | 600/347 |
| 2009/0235124 A1 | * | 9/2009 | Schmidt ......................... | 714/48 |
| 2011/0095758 A1 | * | 4/2011 | Walsh ........................... | 324/307 |

FOREIGN PATENT DOCUMENTS

| | | |
|---|---|---|
| CA | 2614658 A1 | 5/2001 |
| EP | 0342859 A2 | 11/1989 |
| EP | 2058911 A1 | 5/2009 |
| WO | WO2009062145 A1 | 5/2009 |

* cited by examiner

*Primary Examiner* — Omer Khan

(74) *Attorney, Agent, or Firm* — Fish & Richardson P.C.

(57) ABSTRACT

A medical supply unit includes a bus system for transmitting instructions of control elements to actuators. The bus system is provided with transmitters and receivers being connected to each other by a transmission system. Via the transmission system, commands of the transmitters are transmitted, which are controlled by the control elements, and the responsive receiver transfers the command to a switching instruction at an output of the responsive receiver so as to control an actuator.

22 Claims, 7 Drawing Sheets

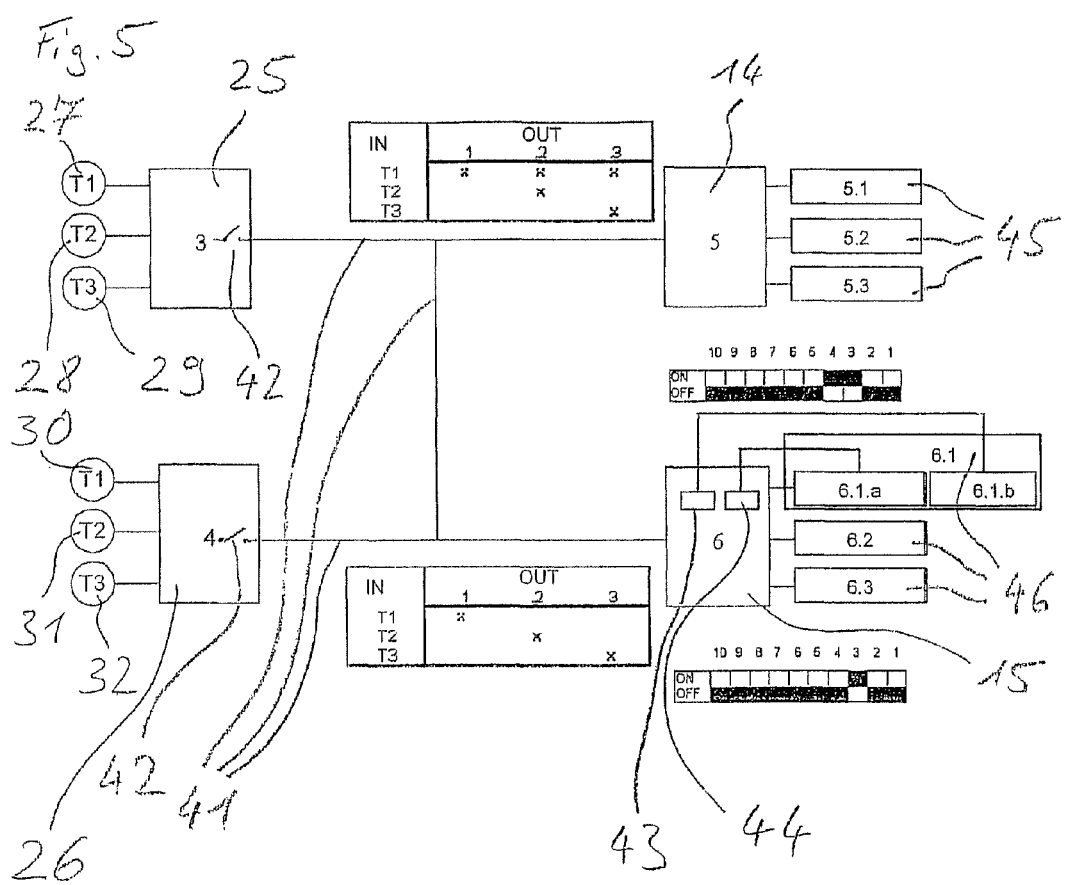

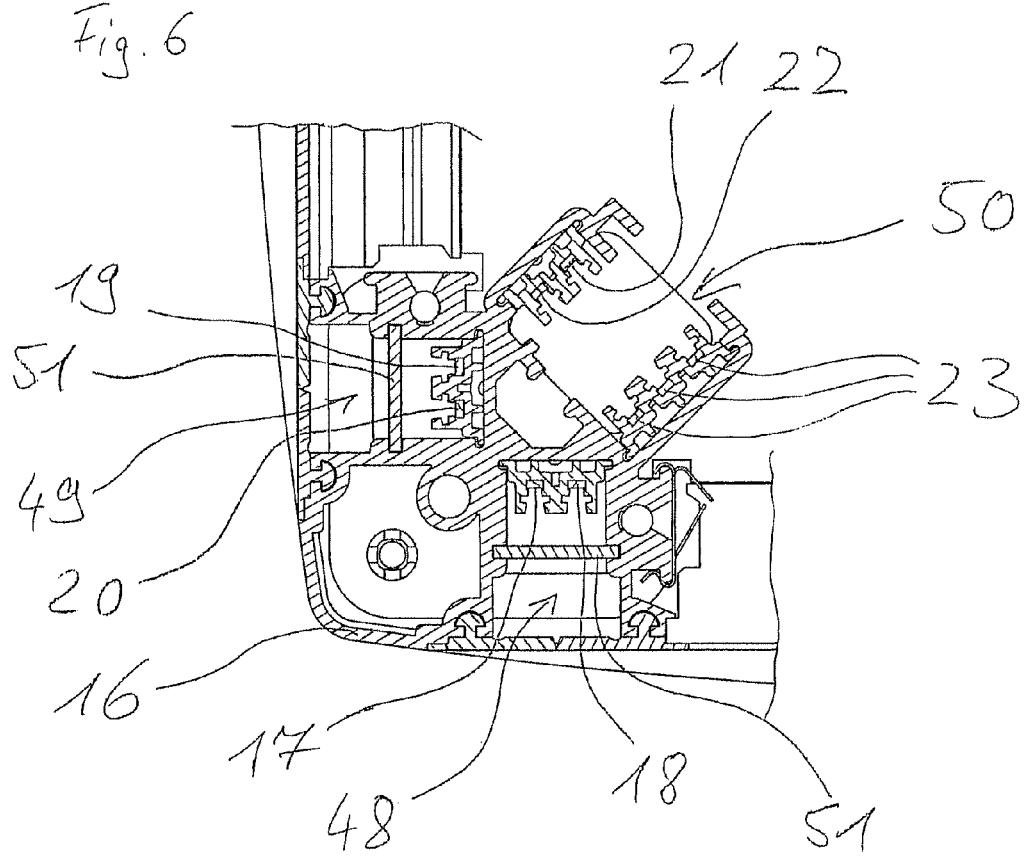

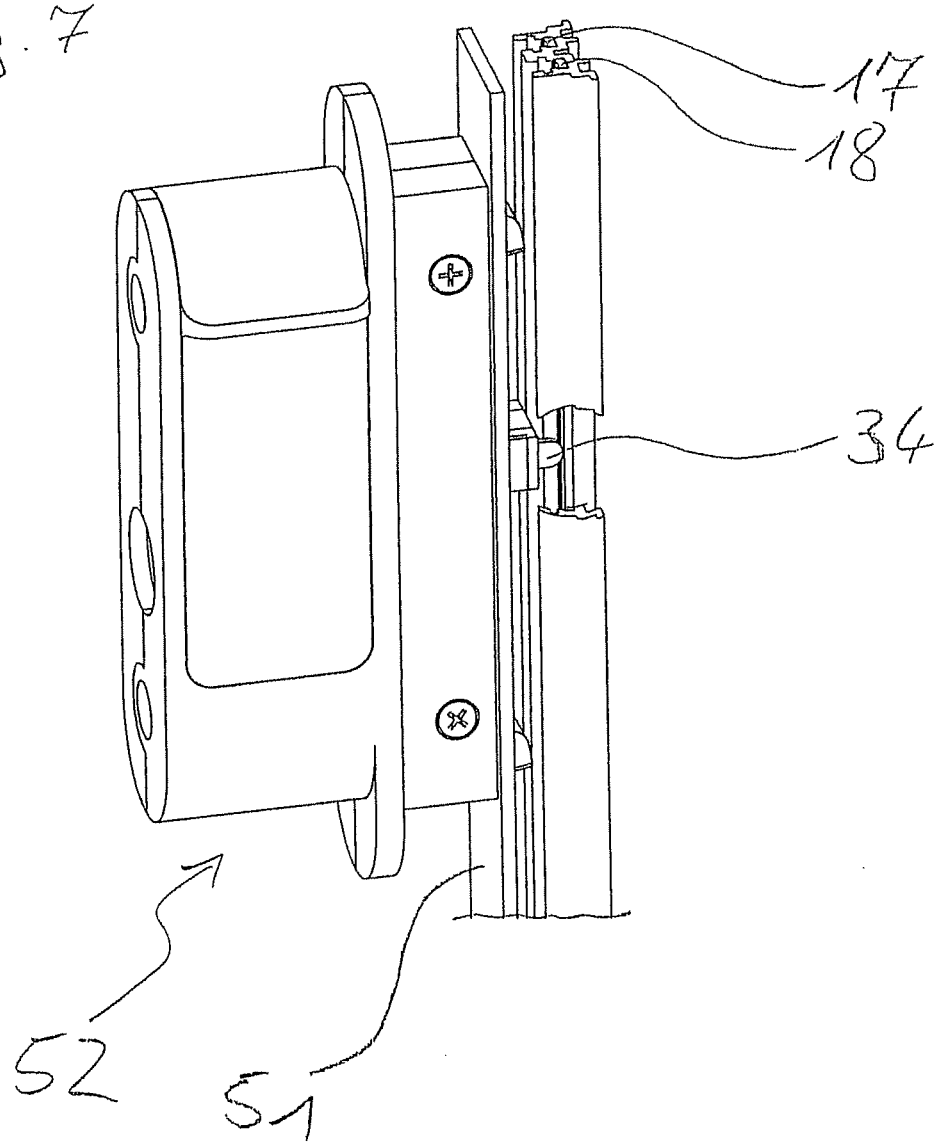

TRANSMITTING INSTRUCTIONS IN A MEDICAL SUPPLY UNIT

CROSS-REFERENCE TO RELATED APPLICATION

This application claims priority under 35 U.S.C. §119 to European Patent Application No. 09 176 116.3, filed on Nov. 16, 2009. The contents of the prior application are hereby incorporated by reference in its entirety.

TECHNICAL FIELD

The invention relates to a medical supply unit, in particular to a medical supply unit having a data transmission system for transmitting instructions of control elements to actuators.

BACKGROUND

Medical supply units in operating rooms or in intensive care units are typically implemented in the shape of ceiling mounted support systems, ceiling rails or wall rails. Mobile structures of the medical supply units in these implementations are mainly pivot arms horizontally pivoting about a vertical axis or height adjustable support arms being vertically pivotable around a horizontal axis. For this purpose, a support head for mounting and supporting medical devices and including connections for supplying power to the medical devices, for data communication, and for medical gases, and which is mounted to the pivot arms, can be moved in a desired position. The individual hinges of the horizontal pivot arms are moved in a controlled manner and can be locked by control brakes. The lifting movement of the vertical pivot arms is supported by a spring force, wherein the lifting movement is lockable by a brake, or is formed by means of an electric drive.

The control of the brakes in the hinges for the horizontal pivot movement and in the height adjustable support system arm is mostly performed pneumatically. In some cases, the control is also performed electrically. The connection between the control elements and actuators and also brakes and drives is made by direct wiring or by a direct hose system, which involves highly complex wiring and hosing work.

The control elements are typically implemented as pneumatic valves or electric switches, and are accommodated in operating handles of the support head. In some situations, the position of the operating handles may interfere with changes to the placement of medical devices on the care unit. In such instances, repositioning the operating handles on the support head may be difficult or impossible due to limitations imposed by the fastening of pneumatic lines or electric cables. In addition to limiting the movement of the operating handles, pneumatic lines or electric cables often impair the hygienic conditions. For example, lines implemented as flying hoses or cables can increase the work for cleaning and disinfection and impair the possibilities for cleaning and disinfection at the same time.

Such systems further limit control of the actuator by several control elements due to the required complexity of the wiring or the hose system.

SUMMARY

In one aspect, a medical supply unit having a bus system including a transmission system, a transmitter, and a receiver is provided in which a signal transmission between the control elements and the actuators enables flexible shifting of the control elements without impairing the hygienic conditions and enables a simple realization of the control of the actuators associated with the control elements.

In another aspect, a medical supply unit is provided including a housing with connectors for connecting medical devices, the housing coupled to an actuator for positioning the housing responsive to instructions from a control element; and a bus system coupled between the actuator and the control element, the bus system configured to transmit the instruction of the control element to the actuator, the bus system including: a transmission system configured to transmit signals as commands; a transmitter comprising a transmitter address and configured to emit at least one command via the transmission system; and a receiver comprising an output and a receiver address, the receiver configured to receive commands of the transmitter and to transfer commands associated with the receiver to switching commands at the output of the receiver.

In yet another aspect, a medical supply unit is provided including control elements, actuators, and a bus system coupled to the control elements and the actuators, the bus system configured to transmit instructions of the control elements to the actuators, the bus system including: a transmission system for transmitting signals as commands; a transmitter comprising an address and configured to emit a command via the transmission system; and a receiver comprising an address and at least one output, such that the receiver is configured to receive commands of the transmitter, and, based on an association between the address of the transmitter and the address of the receiver, is configured to produce a switching instruction at the at least one output of the receiver.

In still another aspect, a bus system configured to transmit instructions of control elements of a medical supply unit to actuators of the medical supply unit is provided, the bus system including: a transmission system for transmitting signals as commands; at least one transmitter comprising an address and configured to emit at least one command via the transmission system; and at least one receiver comprising an address and at least one output, the at least one receiver configured to receive commands of the at least one transmitter and to transfer commands responsive to the at least one receiver to switching commands at the at least one output.

These and other implementations may each optionally include one or more of the following features. For example, the transmission system may be a wireless transmission system. In some instances, the transmission system may be a line system, and the transmitter may include a connection device configured to connect the transmitter to the line system, and the receiver may include a connection device configured to connect the receiver to the line system. The line system may include current bars, and the transmitter may include a fastener for flexibly mounting the transmitter to different positions along the current bar. During operation of the bus system, the transmitter may be configured to automatically be ready to transmit after contacting the line system. The bus system may be configured, by configuration software, to allocate one address to the transmitter and one address to the receiver. The transmitter may include an input keyboard. The output of the receiver may be a first output and the receiver may include a second output, such that the bus system is configured, by configuration software, to associate the first and second outputs with different keys of the input keyboard. The transmitter may be a first transmitter, and the bus system may include a second transmitter, such that the receiver is configured to receive commands from the first and second transmitters. The receiver may be a first receiver, and the bus system may include a second receiver, such that the second receiver is configured to receive commands from the transmitter and to transfer commands associated with the second receiver to switching commands at the output of the second receiver. The transmitter may include an analog switch configured to connect the transmitter to the transmission system, such that the at least one command is emitted to the transmission system only when the analog switch is closed. The transmitter may be configured to periodically emit the at least one command, and the receiver may be configured to deactivate the output after lapse of a predetermined time, when a command associated with the receiver is not received. The receiver may include a first receiving unit having an output and a second receiving unit having an output, such that the outputs of the first and second receiving units are coupled to each other in series. The first and second receiving units may include matching hardware and differing software. The output may be coupled to an operating element of a brake or of a lifting motor. The bus system may be a first bus system, and the medical supply unit may further include: a second bus system, the first and second bus systems each having a local and a global address area; and a router configured to make a data connection between the global address areas of the first and second bus systems. The at least one output may include multiple outputs arranged in series, and the receiver may further include: multiple receiving units, each coupled to a corresponding one of the multiple outputs; such that the switching instruction is executed only if each of the multiple receiving units outputs a switching signal to the corresponding one of the multiple outputs. The transmitter may be one of multiple transmitters and the receiver may be one of multiple receivers, such that one or more of the multiple transmitters has an address associated with an address of one or more of the multiple receivers.

The invention is described by means of an embodiment, with reference to the accompanying figures.

DESCRIPTION OF DRAWINGS

FIG. 5 is a block diagram of an example of a bus system.

FIG. 6 is a cross-section of an alternative support head profile.

FIG. 7 is a perspective view of an alternative fixing element for an operating handle.

DETAILED DESCRIPTION

Figure 1:
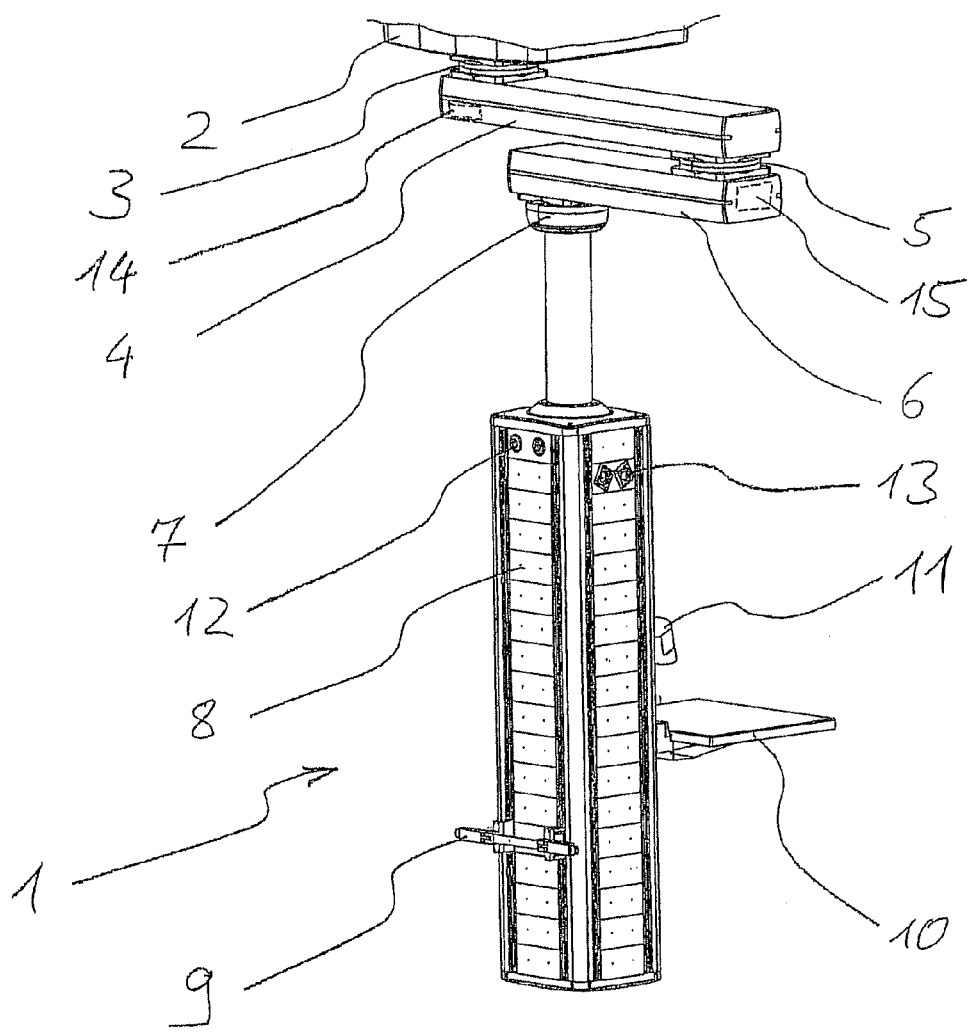
FIG. 1 is a perspective view of a medical supply unit.

FIG. 1 shows a ceiling mounted support system as an embodiment of a medical supply unit 1. The medical supply unit 1 comprises a ceiling fastener 2, by which the medical supply unit 1 is fixed to the room ceiling. Fixed to the ceiling fastener 2, the medical supply unit 1 comprises an upper rotating hinge 3 having a control brake. At the end of the upper side of the upper rotating hinge 3, an upper pivot arm 4 is fixed. At the opposed end of the upper pivot arm 4, an intermediate rotating hinge 5 having a control brake is mounted at the lower side thereof. To the intermediate rotating hinge 5, a lower pivot arm 6 in turn is mounted at the end of the upper side thereof. At the opposing end of the lower pivot arm 6, a lower rotating hinge 7 having a control brake is mounted at the lower side thereof. A pipe extends from the lower rotating hinge 7, wherein a support head 8 is attached thereto. The support head 8 comprises a square cross-section having rounded corners and extends cylindrically downwards. At the side of the support head 8, an operating handle 9 is mounted. At the opposing side of the operating handle 9, a platform 10 and a lamp 11 are mounted and depicted to be partly covered. In lateral faces of the support head 8, gas connectors 12 and electrical connectors 13 are provided.

The medical supply unit 1 serves to receive medical devices, which are mounted on the platform 10, for example, and which are connected by means of supply hoses and cables to the gas connector 12 and the electrical connector 13 and are supplied therewith.

In the upper pivot arm 4 and in the lower pivot arm 5, there are provided receivers 14, 15 which are described later. The receivers 14, 15 are connected to operating elements of the controlled brakes of the upper rotating hinge 3 and the lower rotating hinge 5.

The support head 8 can ergonomically be grasped by an operator at the operating handle 9, and can arbitrarily be positioned within the framework of the pivoting area of the upper arm 4 and the lower arm 6.

In an alternative embodiment, the lower pivot arm is provided as a height adjustable arm. Herein, it is possible to change the support head 8 not only in a horizontal direction, but also to position the height of the support head 8 within the vertical pivot area of the height adjustable arm. The height adjustable arm is then provided with a receiver 14, 15 which is provided with an output which in turn is connected to an operating element of a lifting motor.

In a further alternative embodiment, the configuration of the medical supply unit is also possible as ceiling mounted support system having another arm configuration, for example as a single arm with or without height adjustable arm, or with an alternative supporting structure of the support head, for example a ceiling rail or wall rail. The controllable brakes do not only act to the rotating hinges, but also to a carriage, for example, which supports the support head and is arranged at a rail. Here, additional pivot arms are also possible.

Figure 2:
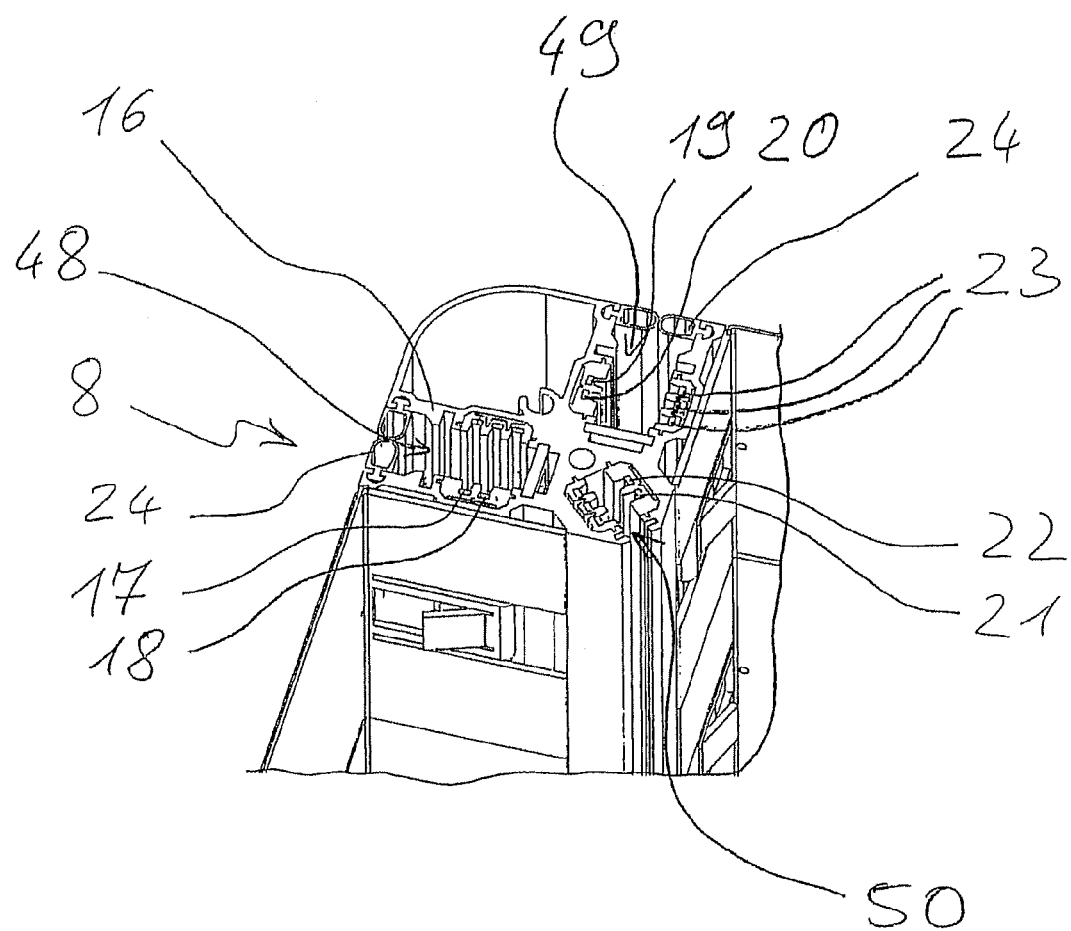
FIG. 2 is a perspective view of a support head profile without support head lid.

FIG. 2 shows a perspective oblique view from the top to the support head 8 in an area of the support head profile 16. In favor of better illustration, the lid of the support head 8 has been omitted here. The support head profile 16 is arranged in the corner area of the support head 8. The support head profile 16 is designed to comprise three substantially cuboid depressions 48, 49, 50 which are arranged such that a respective depression 48, 49 extends inwardly from two outer faces of the support head 8, and a cuboid depression 50 extends outwardly from an inside of the support head 8.

The cuboid depressions 48, 49, 50 comprise current bars at their lateral faces. At one side of a depression 48, which extends inwardly from the outer face, a current bar 17 and a current bar 18 are provided, which are part of a two-pole line system. In the depression 49 extending inwardly from the outside, a third current bar 19 and a fourth current bar 20 are provided. In the lateral faces of the depression 50 extending outwardly from the inside, a fifth current bar 21 and a sixth current bar 22 are provided. The first current bar 17, the third current bar 19 and the fifth current bar 21 are conductively connected to each other. The second current bar 18, the fourth current bar 20, and the sixth current bar 20 are also conductively connected to each other. The first and second, the third and fourth, the fifth and sixth current bars are insulated from each other by an insulation body. At the opposite site to the third current bar 19 and the fourth current bar 20, there are depicted three seventh current bars 23. The seventh current bars 23 serve for power supply of the support head 8 and the components mounted thereon. The first current bar 17, the second current bar 18, the third current bar 19, the fourth current bar 20, the fifth current bar 21 and the sixth current bar 22 form parts of a line system of a bus system for transmitting instructions of control elements to actuators.

The structure and the shape of the support head differ in an alternative embodiment from the described support head 8. Alternative embodiments do not comprise a cuboid cross-section, for example, but another suitable shape. Also the bus construction with profiles and the to design of the profiles with three cuboid depressions are not obligatory but can be formed in further embodiments by alternative structures.

Figure 3:
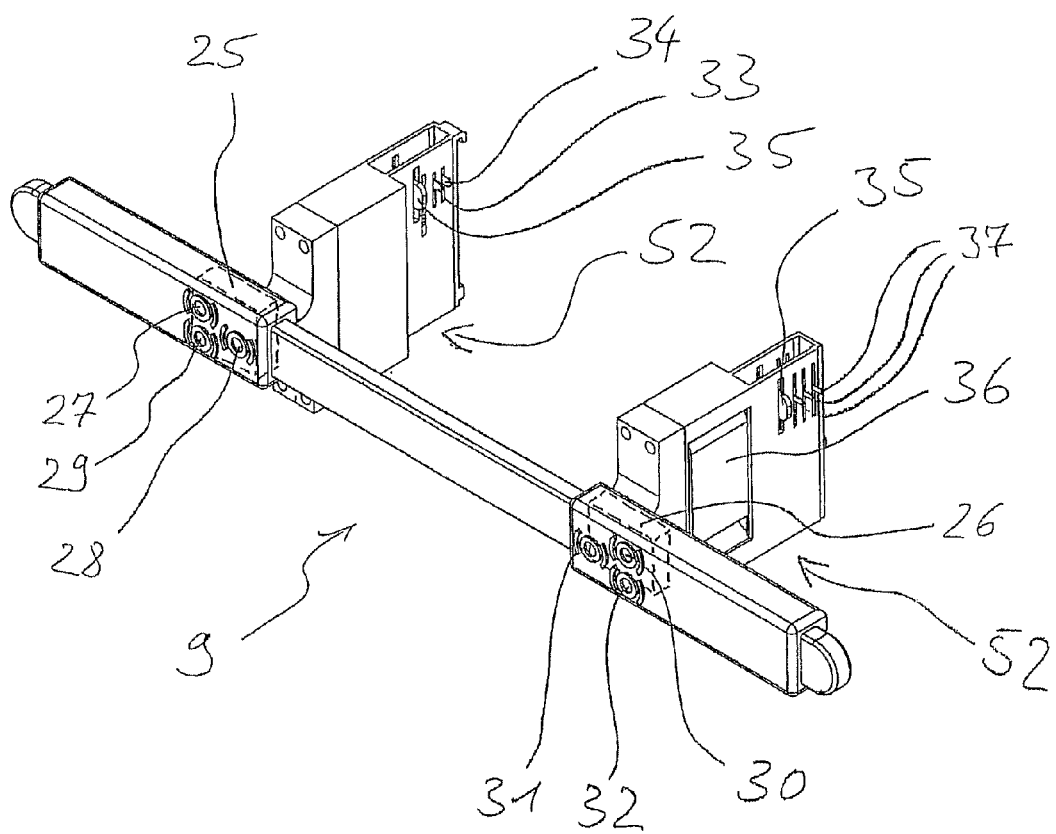
FIG. 3 is a perspective view of an operating handle.

FIG. 3 shows the operating handle 9 in a perspective view in a dismantled condition. Within the operating handle, a first transmitter 25 and a second transmitter 26 are provided. The first transmitter 25 is provided with an input keyboard having several keys, that is, a first upper key 27, a first intermediate key 28, and a first lower key 29. The second transmitter 26 is also provided with an input keyboard, that is, a second upper key 30, a second intermediate key 31 and a second lower key 32. The first transmitter 25 is connected to cable connections, which are not shown, by a first line contact 33 and a second line contact 34. Both line contacts 33, 34 are shown in FIG. 3 in a locked position in which they laterally project from the wall of a fastener element 52 of the operating handle 9. Adjacent to the line contacts 33, 34, a locking plate 35 is arranged, which is axial non-rotatable connected to the line contacts 33, 34. At the fastener element 52 of the operating handle 9 which is represented on the right side of FIG. 3, there is also shown a locking plate 35 which is non-rotatable connected to two line contacts, which are not depicted here, as well as to three low voltage contacts 37 in a non-rotable manner, which secure a power supply of peripheral parts. In the fastener element 52, which is depicted on the right side, the locking plate 35, the non-shown line contacts and the low voltage contacts 37 are non-rotable connected to a locking lever 36.

In operation, by folding the locking lever 36 in a horizontal position, the locking plate 35, the not-shown line contacts and the low voltage contacts 37 are rotated through about 90°, so that they enter into the fixing element 52 and thus enable mounting the operating handle 9 into the cylindrical depressions 48, 49, 50 of the support head 8. By folding the locking levers 36 in the shown position, the locking plate 35, the line contacts and the low voltage contacts 37 leave the fastener element 52 again, the locking plate 35 locks the operating handle in the support head profile 16, and the line contacts and the low voltage contacts 35 make a conductive contact with the current bars 1 to 22. Locking and contacting the fastener element 52 of the operating handle 9 shown at the left side in FIG. 3 are made in an analogous way.

Figure 4:
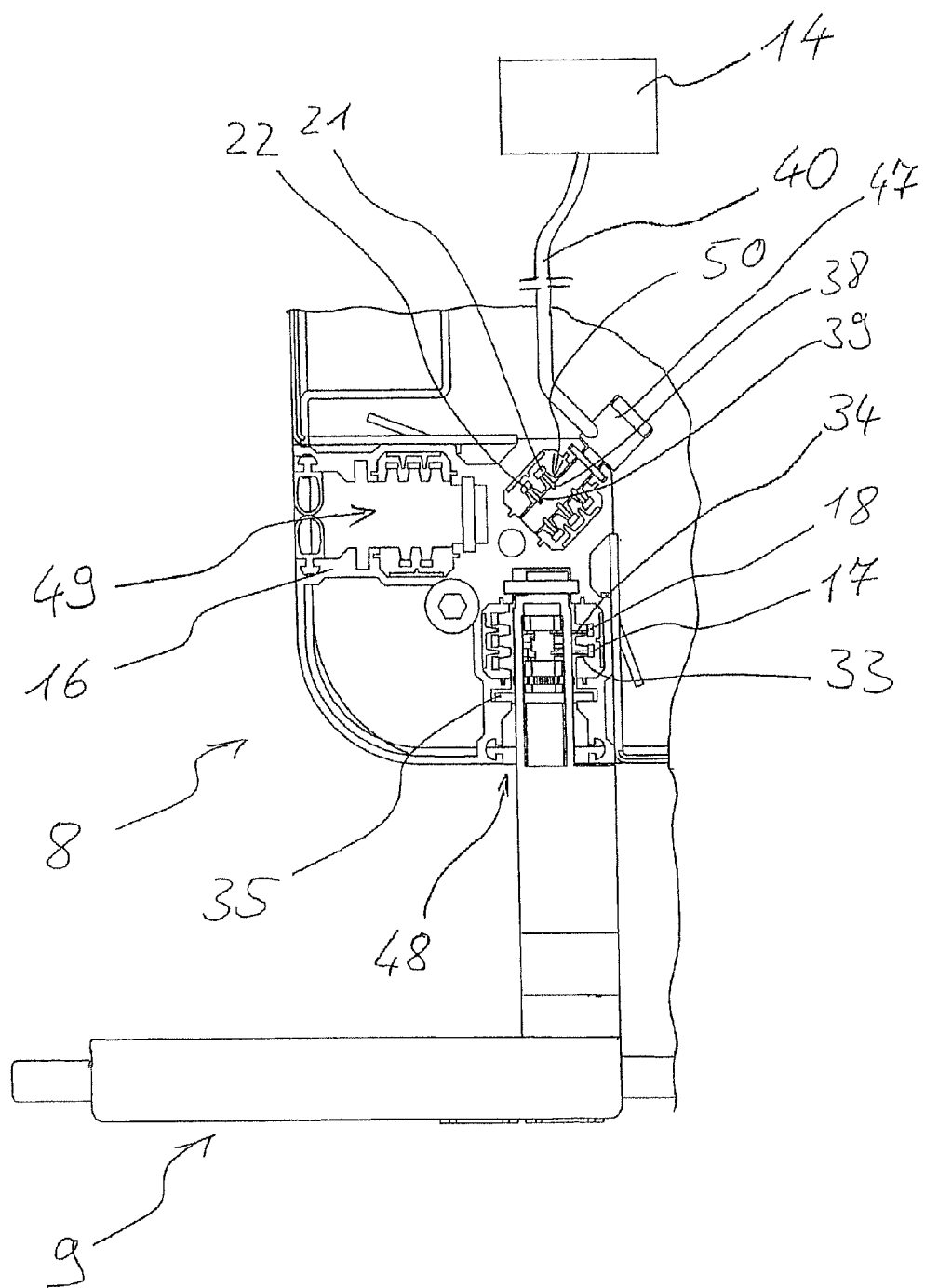
FIG. 4 is a plan view of the support head profile without support head lid with contacted transmitter and receiver.

The operating handle 9 and the support head 8 are represented in FIG. 4 in a locked and contacted condition, where the operating handle 9 is locked and contacted with the depression 48 which is shown in the lower part in the figure.

In the depression 50 extending outwardly from the inside in FIG. 4 from the upper right corner of the support head profile 16 in a direction to the outer corner of the support head profile 16, a connection element 47 is locked, which comprises a third line contact 38 and a fourth line contact 39. The line contacts 38, 39 are in conductive contact with the current bars 21, 22. Since the fifth current bar 21 is connected to the first current bar 17 and the third current bar 19, and since the sixth current bar 22 is connected to the second current bar 18 and the fourth current bar 20, the line contacts 38, 39 of the connecting elements 47 are connected to the line contacts 33, 34 of the operating handle 9. A line cable 40 extends from the connection element 47 towards the receiver 14 which is arranged in the upper pivot arm 4 of the medical supply unit 1 (see FIG. 1). Thereby, a two-pole line system is formed by the current bars 17 to 22 and the line cable 40.

In an alternative embodiment, the line system can also provide more than two poles, or in a further alternative embodiment, one pole can be realized by the conductive housing.

FIG. 5 shows a block diagram of a bus system. The bus system comprises a line system 41 which is formed by the current bars 17 to 22 and the line cable 40 as described above. In the bus system, the first transmitter 25 is incorporated which comprises the address 3. Further, the second transmitter 26 is incorporated which comprises the address 4. The receivers 14 and 15 comprise the addresses 5 and 6, respectively, and they are also incorporated into the bus system. The receiver 14 comprises three outputs 45 which are designated by 5.1, 5.2 and 5.3. The receiver 15 comprises three outputs 46 which are designated by 6.1, 6.2 and 6.3.

The transmitters 25, 26 each comprise a connection device to connect the transmitter 25, 26 to the line system 41. The transmitters 25, 26 are formed to emit a determined command into the line system 41 according to pressing a key (T1) 27, a key (T2) 28 or a key (T3) 29. In an analogous manner, the second transmitter 26 emits a command into the line system 41 in accordance to pressing a key (T1) 30, a key (T2) 31 or a key (T3) 32. The transmitters 25, 26 are each connected to the line system 41 by an analog switch 42. The switch 42 is only switched, when one of the respective keys 27-29 or 30-32 is operated. Thereby, it is prevented that an erroneously emitted command of the transmitters 25 or 26 is emitted into the line system 41 without actually pressing one of the keys 27, 28, 29.

Furthermore, the receivers 14, 15 each comprise devices for connecting the receivers 14, 15 to the line system 41. The receivers 14, 15 recognize the command responsive to him on the basis of the address of the transmitters 25, 26, which is emitted together with the command. The receiver 14 having the address 5 and the receiver 15 having the address 6 transfer the command responsive to them in the responding output 45, 46 to a switching instruction. In the circuit scheme in FIG. 5, which is represented below the receiver 14, one can recognize that the receiver 14 responds to the commands of the transmitter 25 having the address 3 and the transmitter 26 having the address 4. From the circuit scheme which is arranged below the receiver 15, one can recognize that the receiver 15 only responds to commands of the transmitter 25 having the address 3. It is also possible to configure the receivers 14, 15 to either respond to the commands of one transmitter 25, 26 or to commands of several transmitters 25, 26. This configuration is allocated by the receiver via configuration software.

Further, it is also possible to communicate one transmitter 25, 26 not only with one receiver 14, 15, but also with several receivers such as in the case of the transmitter 25 having the address 3, where both receivers 14, 15 are made to respond to commands of the transmitter 25, as it can be gathered from both circuit schemes below the receivers 14 and 15.

The shown circuit scheme arranged between the transmitter 25 and the receiver 14 shows how the operation of the key (T1) 27, 30, the key (T2) 28, 31 and the key (T3) 29, 32 is transferred to switching instructions of the outputs 45. The shown circuit scheme which is disposed between the transmitter 26 and the receiver 15 shows how the operation of the key (T1) 27, 30, the key (T2) 28, 31 and the key (T3) 29, 32 is transferred to switching instructions of the output 46. It can be recognized from these circuit schemes and from both other circuit schemes, that pressing the key (T1) 27 creates a switching instruction of the output 45 designated with 5.1, 5.2 and 5.3 and of the output 46 designated by 6.1. Pressing the key (T2) 28 makes only one switching instruction of the outputs 45, 46 which are designated by 5.2 and 6.2. Pressing the key (T3) 29 makes only one switching instruction of the outputs 45, 46 designated by 5.3 and 6.3. Pressing the key (T1) 30 makes one switching instruction of the output 45 designated by 5.1, 5.2 and 5.3. Pressing the key (T2) 31 makes only one switching instruction of the output 45 designated by 5.2. Pressing the key (T3) 32 makes only one switching instruction of the output 45 designated by 5.3. Hence, by the command of a transmitter, several receivers can be controlled.

The receiver 15 comprises receiving units 43, 44 which are respectively connected to one of the outputs 46. The receiving unit 43 connected to the output 46 designated by 6.1.b and the receiving unit 44 connected to the output 46 designated by 6.1.a are connected in series. The receiving units 43, 44 each comprise the same hardware, but they are controlled by different programs. The switching instruction at the output designated by 6.1 is executed only when both receiving units 43, 44 output a switching signal at the respective outputs designated by 6.1.a and 6.1.b. By using different software which is favorably created by two different programmers, it is secured that an error in the receiver 15 is not put to an undesired switching instruction of the output 46 designated by 6.1. This control of the output 46 is used by security relevant functions such as the lifting movement of the height adjustable pivot arm, so that there is no risk for a patient by self-triggering the arm. The construction of several outputs 45, 46 which are connected in series and of several receiving units 43, 44 can be realized in only one or in several receivers 14, 15.

A further security means for preventing a malfunction is making the transmitter 25, 26 to periodically emit a command, i.e., repeatedly again and again. The receiver 14, 15 executes a switching action in the responsive output 45, 46 as long as it receives the command, and it deactivates the output only after a predetermined time, for example 100 ms, when the command is not received anymore. The output is therefore only switched as long as the transmitters 25, 26 emit a command. Nevertheless, if a data packet of a command gets erroneously lost, the output 25, 26 is not deactivated immediately.

To configure the bus system, the configuration software is used by which one address can be allocated to each transmitter 25, 26 and each receiver 15, 16, respectively. In an alternative embodiment, the addresses of the transmitters 25, 26 and the receivers 15, 16 are adjusted by switches, or they are predetermined.

In operation, it is possible to cut-off one or several transmitters 25, 26 from the bus system, for example, to take the operating handle 9 away from the support head 8 in order to mount it at another place to the support head 8 again. The transmitters 25, 26 are formed such that the function of the transmitters 25, 26 is automatically given also during operation of the bus system by newly mounting the operating handle 9 to a position along the current bar 17 to 22, i.e., it is automatically ready to transmit.

FIG. 6 shows an alternative embodiment of a support head profile 16. The essential difference to the support head profile 16 as shown in FIGS. 2 and 4 is the arrangement of the current bars 17 to 20 in the outer depressions 48, 49 as well as the locking possibility of the operating handle in the support head profile 16. The current bars 17 to 20 are not provided at the lateral faces of the depressions 48, 49 here, but at the respective rear walls. Between the rear wall and the openings at the outer faces of the support head profile 16, a fixing rail 51 is provided, for example for fixing an operating handle.

A fixing element 52 such as an operating handle which belongs to the support head profile as shown in FIG. 6 is shown in FIG. 7. The line contacts, whereof only the line contact 34 is shown here, are not radially but axially moved from the fixing element 52, and they make a conductive contact to the current bars 17, 18. The lock is not performed by rotating locking plates 35 here, but the fixing element 52 is hooked into the fixing rail 51 and secured against unhooking.

In an alternative embodiment of the medical supply unit, where a ceiling mounted support system in the shape of a support head having the associated arms and hinges is not provided at a ceiling fastener 2, but two or several ceiling mounted support systems are provided, an own bus system is provided for each ceiling mounted support system. The bus systems are then connected to a router. Each bus system comprises a local address area which only includes the receivers of the respective ceiling mounted support systems as well as a global address area which also includes the addresses of the receivers of further ceiling mounted support systems. Herein, it is conceivable that receivers having outputs for lights to be analogously switched at several support heads are included in a global address area, for example.

Further, in alternative embodiments, the transmission of the commands is not executed by a transmission system in the shape of a line system. The transmission system is wireless there, for example in the shape of a wireless transmission system or an optical transmission system. In a specific embodiment, the wireless transmission system is embodied as a Bluetooth bus system.

In further alternative embodiments, the number of the transmitters and the receivers as well as the number of the respective control elements included in the transmitters, such as keys and outputs, are changed. Also, the number of the transmitters in the operating handles is changed in accordance to the equipment of the medical supply unit. The number of the line contacts at the connection elements of the transmitters and receivers is also variable and depends on the number of the poles and the configuration of the bus system.

The invention claimed is:

1. A medical supply unit comprising:
 a housing with connectors for connecting medical devices, the housing coupled to a handle for manipulating the housing, and the housing coupled to a pivot arm that is connected to a hinge having a brake or connected to a lifting motor, wherein the brake or the lifting motor is operable to receive instructions from a control element disposed within the handle, the instructions allowing the pivot arm that is connected to the hinge or the lifting motor to be locked in a fixed position, moved horizontally, or moved vertically, such that the housing coupled to the pivot arm can be locked in the fixed position, moved horizontally, or moved vertically; and
 a bus system coupled between the brake or the lifting motor and the control element, the bus system configured to transmit the instructions of the control element to the brake or the lifting motor, the bus system comprising:
  a transmission system configured to transmit signals as commands;
  a transmitter comprising a transmitter address and configured to transmit at least one command associated with the instructions via the transmission system; and
  a receiver comprising:
   a first receiving unit having a first output and a second receiving unit having a second output, wherein the first and second receiving units comprise different softwares, and wherein the first and second outputs are coupled to each other in series to form a receiver output that executes a switching instruction only when the first and second receiving units output respective switching signals at the first and second outputs, and a receiver address, wherein the receiver is configured to receive the at least one command of the transmitter and to transmit the at least one command associated with the receiver to the switching instruction at the receiver output.

2. The medical supply unit of claim 1, wherein the transmission system further comprises a wireless transmission system.

3. The medical supply unit of claim 1, wherein the transmission system further comprises a line system, and wherein the transmitter further comprises a first connection device configured to connect the transmitter to the line system, and the receiver further comprises a second connection device configured to connect the receiver to the line system.

4. The medical supply unit of claim 3, wherein the line system further comprises the current bars, and the transmitter further comprises a fastener for flexibly mounting the transmitter to different positions along the current bars.

5. The medical supply unit of claim 3, wherein, during an operation of the bus system, the transmitter is further configured to automatically be ready to transmit the at least one command after connecting to the line system.

6. The medical supply unit of claim 1, wherein the bus system is further configured, by a configuration software, to allocate the transmitter address to the transmitter and the receiver address to the receiver.

7. The medical supply unit of claim 1, wherein the transmitter further comprises an input keyboard.

8. The medical supply unit of claim 7, wherein the bus system is further configured, by a configuration software, to associate the first and second outputs with different keys of the input keyboard.

9. The medical supply unit of claim 1, wherein the transmitter is a first transmitter, the bus system further comprising a second transmitter, and wherein the receiver is configured to receive respective commands from the first and second transmitters.

10. The medical supply unit of claim 1, wherein the receiver is a first receiver, and the bus system further comprises a second receiver, and wherein the second receiver is configured to receive the at least one command from the transmitter and to transmit the at least one command associated with the second receiver to the switching instruction at an output of the second receiver.

11. The medical supply unit of claim 1, wherein the transmitter further comprises an analog switch configured to connect the transmitter to the transmission system, and wherein the at least one command is transmitted to the transmission system only when the analog switch is closed.

12. The medical supply unit of claim 1, wherein the transmitter is further configured to periodically transmit the at least one command, and wherein the receiver is further configured to deactivate the receiver output after lapse of a predetermined time, when the at least one command associated with the receiver is not received.

13. The medical supply unit of claim 1, wherein the first and second receiving units further comprise a matching hardware.

14. The medical supply unit of claim 1, wherein the receiver output is coupled to an operating element of the brake or of the lifting motor.

15. The medical supply unit of claim 1, wherein the bus system is a first bus system, the medical supply unit further comprising:
a second bus system, the first and second bus systems each having a local and a global address area; and
a router configured to make a data connection between the global address areas of the first and second bus systems.

16. A medical supply unit comprising:
control elements disposed within a handle of the medical supply unit;
a brake of a hinge that is connected to a pivot arm, or a lifting motor that is connected to the pivot arm, the brake or lifting motor operable to receive instructions from the control elements to allow the pivot arm that is connected to the hinge or the lifting motor to be locked in a fixed position, moved horizontally, or moved vertically, wherein a housing of the medical supply unit is coupled to the pivot arm and the housing is coupled to the handle for manipulating the housing, such that the housing can be locked in the fixed position, moved horizontally, or moved vertically; and
a bus system coupled to the control elements and the brake or the lifting motor, the bus system configured to transmit the instructions of the control elements to the brake or the lifting motor, the bus system comprising:
a transmission system for transmitting signals as commands;
a transmitter comprising a transmitter address and configured to transmit a command associated with the instructions via the transmission system; and
a receiver comprising:
a first receiving unit having a first output and a second receiving unit having a second output, wherein the first and second receiving units comprise different softwares, and wherein the first and second outputs are coupled to each other in series to form a receiver output that executes a switching instruction only when the first and second receiving units output respective switching signals at the first and second outputs, and
a receiver address,
wherein the receiver is configured to receive the command of the transmitter, and, based on an association between the transmitter address and the receiver address, is configured to produce the switching instruction at the receiver output.

17. The medical supply unit of claim 16,
wherein the receiver output further comprises additional outputs arranged in series with the first and second outputs,
wherein the receiver further comprises additional receiving units, each additional receiving unit coupled to a corresponding one of the additional outputs, and
wherein the switching instruction is executed only if each of the first, second, and additional receiving units outputs a switching signal to a corresponding one of the first, second, and additional outputs.

18. The medical supply unit of claim 16, wherein the transmitter is one of multiple transmitters and the receiver is one of multiple receivers, and wherein at least two of the multiple transmitters have transmitter addresses associated with a respective receiver address of one more at least two of the multiple receivers.

19. A bus system configured to transmit instructions of control elements disposed within a handle of a medical supply unit to at least one of a brake of a hinge that is connected to a pivot arm of the medical supply unit, or a lifting motor that is connected to the pivot arm of the medical supply unit, the brake or the lifting motor operable to receive the instructions from the control elements to allow the pivot arm that is connected to the hinge or the lifting motor to be locked in a fixed position, moved horizontally, or moved vertically, wherein a housing of the medical supply unit is coupled to the pivot arm, and the housing is coupled to the handle for manipulating the housing, such that the housing can be locked in the fixed position, moved horizontally, or moved vertically, the bus system comprising:
- a transmission system for transmitting signals as commands;
- at least one transmitter comprising a transmitter address, and configured to transmit at least one command associated with the instructions via the transmission system; and
- at least one receiver comprising:
  - a first receiving unit having a first output and a second receiving unit having a second output, wherein the first and second receiving units comprise different softwares, and wherein the first and second outputs are coupled to each other in series to form a receiver output that executes a switching instruction only when the first and second receiving units output respective switching signals at the first and second outputs, and
  - a receiver address,
  - wherein the at least one receiver is configured to receive the at least one command of the at least one transmitter and to transmit the at least one command responsive to the at least one receiver to the switching instruction at the receiver output.

20. The medical supply unit of claim 1, wherein the pivot arm is connected to the hinge having the break and connected to the lifting motor, and wherein the brake and the lifting motor are operable to receive the instructions from the control element to allow the pivot arm to be locked in the fixed position, moved horizontally, and moved vertically, such that the housing coupled to the pivot arm can be locked in the fixed position, moved horizontally, and moved vertically.

21. The medical supply unit of claim 16, wherein the pivot arm is connected to the hinge having the break and connected to the lifting motor, and wherein the brake and the lifting motor are operable to receive the instructions from the control elements to allow the pivot arm to be locked in the fixed position, moved horizontally, and moved vertically, such that the housing coupled to the pivot arm can be locked in the fixed position, moved horizontally, and moved vertically.

22. The medical supply unit of claim 16, wherein the handle is vertically positionable along the housing and attached to the housing in a manner such that the handle is in direct contact with the transmission system.

* * * * *

UNITED STATES PATENT AND TRADEMARK OFFICE
CERTIFICATE OF CORRECTION

PATENT NO.         : 8,810,357 B2                                    Page 1 of 1
APPLICATION NO.    : 12/947499
DATED              : August 19, 2014
INVENTOR(S)        : Georg Bauer et al.

It is certified that error appears in the above-identified patent and that said Letters Patent is hereby corrected as shown below:

In the claims,

In column 10, line 62 (Claim 18, line 62) after "address of" delete "one more".

Signed and Sealed this
Twenty-first Day of April, 2015

Michelle K. Lee
*Director of the United States Patent and Trademark Office*